Aug. 16, 1960     E. J. DAVIDSON     2,949,513
EFFECTIVE TEMPERATURE THERMOSTAT
Filed Sept. 3, 1957
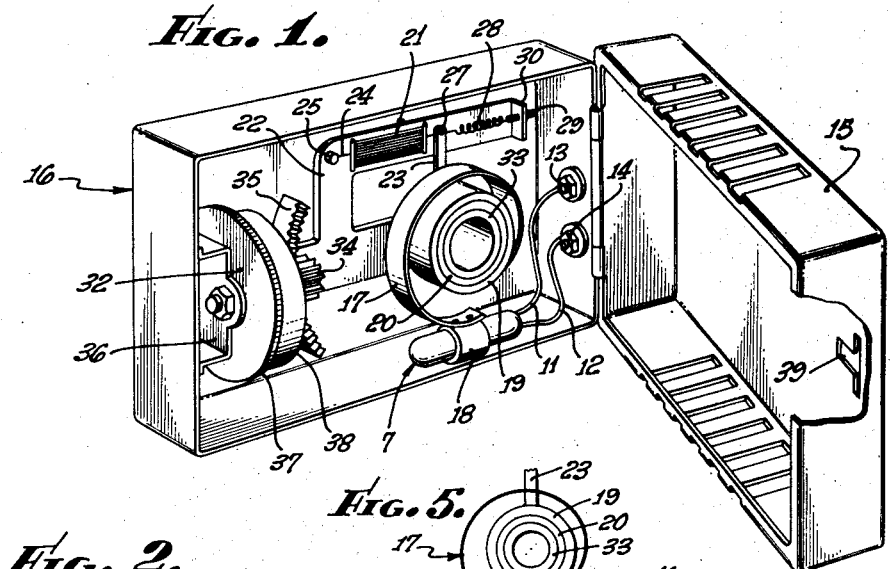
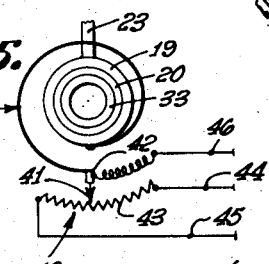
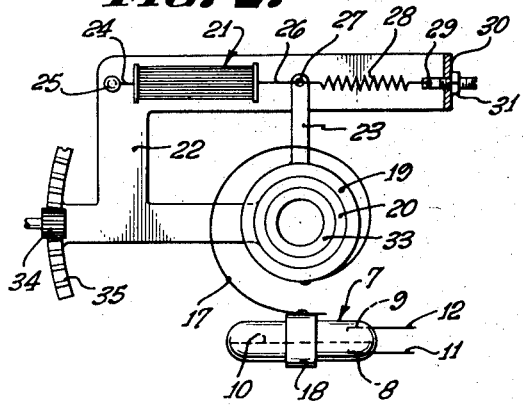
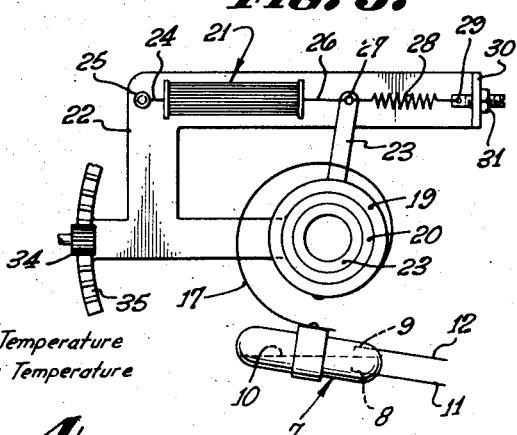
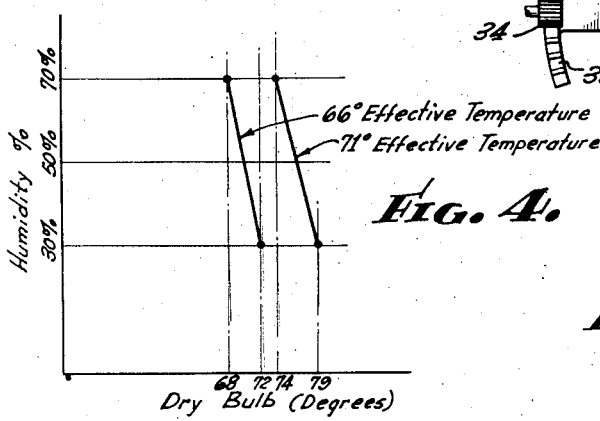
INVENTOR.
EVAN J. DAVIDSON,
BY Flam and Flam
ATTORNEYS.

United States Patent Office 2,949,513
Patented Aug. 16, 1960

2,949,513
EFFECTIVE TEMPERATURE THERMOSTAT

Evan J. Davidson, North Hollywood, Calif., assignor to General Controls Co., Glendale, Calif., a corporation of California Filed Sept. 3, 1957, Ser. No. 681,700

5 Claims. (Cl. 200—61.06)

This invention relates to a thermostat structure to be used for air heating or cooling systems.

It is well recognized that for a given air velocity, the sense of warmth or coolness depends not only upon the dry bulb temperature of the surrounding air, but also upon its relative humidity or moisture content. Thus, air at 72° dry bulb temperature and at 70% relative humidity is physiologically as comfortable as air at 77° dry bulb temperature and at 30% relative humidity. "Effective temperature" is the term given to the degree of physiological sense of warmth or coolness. In both examples, the effective temperature index is the same.

In order to relate the effective temperature scale to the familiar dry bulb temperature scale, saturated air is taken arbitrarily as the standard. Thus, a 71° effective temperature produces the same sense of warmth or coolness as saturated still (15–25 feet per minute velocity) air at 71° dry bulb temperature.

Thus, in the example given, still air at 77° dry bulb, 30% relative humidity has an effective temperature of 69½°.

A usual thermostat responds to dry bulb temperature. A particular dry bulb temperature may thus correspond to a wide range of effective temperatures, and discomfort may be experienced due to relative humidity despite perfect control by the thermostat. The primary object of this invention is to provide a simple thermostat responsive to effective temperature whereby the foregoing difficulty is avoided.

Due to different habits of dress in temperate climates, an effective temperature of 66° in the winter is found to be most acceptable, whereas 71° effective temperature in the summer is found to be the most acceptable. At 30% relative humidity, air at a dry bulb temperature of 79° is determined to have an effective temperature of 71°; and at 70% relative humidity, air at a dry bulb temperature of 74° is determined to have an effective temperature of 71°. An isotherm plot of effective temperature, taking into consideration relative humidity and dry bulb temperature, deviates only very slightly from a straight line, especially in the comfort range. Hence, to maintain by cooling the 71° effective temperature isotherm for warm weather, an 8% change in relative humidity must cause a 1° opposite change in dry bulb temperature. At 30% relative humidity, air at a dry bulb temperature of 72° has an effective temperature of 66°; and at 70% relative humidity, air at 68° dry bulb has an effective temperature of 66°. Hence, by heating to maintain the 66° effective temperature isotherm for cool weather, a 10% change in relative humidity must cause a 1° opposite change in dry bulb temperature.

Another object of this invention is to provide an effective temperature thermostat appropriately constructed in the light of the above considerations, and which can be readily calibrated.

Still another object of this invention is to provide a thermostat of this character that can readily be adjusted throughout a range of effective temperatures.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a pictorial view of apparatus incorporating the present invention;

Figs. 2 and 3 are diagrammatic views illustrating positions of the mechanism at different relative humidities, the dial setting and dry bulb temperature being the same;

Fig. 4 is a graph illustrating a 71° effective temperature isotherm as a function of relative humidity and dry bulb temperature; and Fig. 5 illustrates the device for use with a different control circuit.

In Fig. 1, there is illustrated by way of example a mercury tilt switch 7 for controlling the operation of an air conditioning system or the like. Internal electrodes 8 and 9 (Fig. 2) of the mercury switch 7 are, in a customary fashion, connected by the mercury pool 10 upon critical angular movement of the mercury switch 7. Leads 11 and 12 (Fig. 1) cooperate with an appropriate energization controlling circuit for the air conditioning system.

The mercury switch 7 and other structure, to be presently described, are enclosed by a base 16 and a cover 15 which is connected to the base by a side hinge. In order to facilitate external connections, the base 16 carries terminal posts 13 and 14 for the leads 11 and 12. Slight slack in the leads ensures appropriate operation of the mercury switch.

The angular position of the mercury switch 7 depends first of all upon a coiled bimetal member 17. For this purpose, the bimetal member 17 carries a sleeve 18 at its free outer end, by the aid of which the switch 7 is mounted.

By appropriately locating the respective elements of the bimetal member, the switch 7, upon an increase in temperature, is caused to move angularly in a clockwise direction about the fixed end of the bimetal member 17, as viewed in the drawings. Such movement causes the mercury pool 10 to connect the electrodes 8 and 9.

For securing the end of the bimetal member 17 remote from the switch 7, there is provided a sleeve 19. This sleeve 19 is rotatably mounted upon a cylindrical hub 20 (see also Fig. 2). The hub 20 is, in turn, mounted in a manner to be hereinafter described. The angular position of the sleeve 19 about the hub 20 and also the angular position of the switch depend upon a hygrometer 21, which may be of the hair strand type. For this purpose, the hygrometer 21 has opposite ends affixed to a mounting plate 22, to which the hub 20 is affixed, and to the bimetal mounting sleeve 19.

A cable 24, at one end of the hygrometer structure 21, is secured to a post 25 carried upon the mounting plate 22. A lever arm 23, which projects radially from the inner end of the bimetal mounting sleeve 19, carries at its outer end a post 27. A cable 26, at the other end of the hygrometer 21, is secured to the post 27. A tension spring 28 maintains the hairs of the hygrometer 21 in taut condition so that the arm 23 appropriately follows the elongation and contraction of the hygrometer 21. For this purpose, one end of the tension spring 28 is secured to the post 27. The opposite end carries a threaded post 29 which projects with clearance through an aperture in an ear 30 formed at the end of the mounting plate 22. A nut 31, cooperable with the threads of the post 29, adjusts the tension of the spring 28.

The ambient air passes to the space between the cover 15 and the base 16 via openings, clearance spaces or the like.

The hygrometer 21 is oriented so that it extends in a direction substantially normal to the arm 23. Since the percentage change in length of the hygrometer throughout a substantial range of relative humidity is small, the deviation of the hygrometer from perpendicular relationship with respect to the arm 23 is correspondingly small, providing the spacing of the post 27 from the axis of movement of the arm is substantial relative to the length of the hair strands of the hygrometer. Thus, for each unit of the elongation and contraction of the hygrometer 21, a corresponding angular movement of the arm 23 results and, hence, a corresponding angular movement of the bimetal mounting sleeve 19 results. In order to minimize the deviation from a truly linear relationship between length of the hygrometer 21 and angular movement of the arm 23, the mechanism is so designed that for a mean relative humidity, for example 50%, a more or less precise normal relationship is achieved.

Since the bimetal mounting sleeve 19 is carried by the hub 20, and the hub is secured to the mounting plate 22, and the hygrometer 21 is mounted on the plate 22, a change in relative humidity will tilt the mercury switch 7 just as a change in temperature will. Fig. 3 illustrates, in an exaggerated manner, the position of parts upon an increase in relative humidity, the dry bulb temperature being the same. The critical position of the mercury switch 7 thus depends not on the relative humidity or dry bulb temperature alone but, rather, upon these factors combined together. By careful design and calibration of the hygrometer 21 relative to the bimetal member 17, the critical position of the mercury switch 7 may exist at a particular effective temperature for still air.

Thus, in Fig. 4, the 71° effective temperature is plotted as a function of humidity and dry bulb temperature. As discussed, above, this effective temperature isotherm approximates a straight line, at least in the humidity range from 30 to 70%. As is apparent from this graph, an 8% change in relative humidity is the equivalent of a 1° change in dry bulb temperature, with only insignificant deviation throughout the range under consideration. The hygrometer 21 and bimetal member 17 are accordingly designed and calibrated to maintain this proportionate relationship. Hence, whenever the effective temperature exceeds 71°, the switch 7 will operate, whether due to humidity, temperature or a combination of both, and operation of the air conditioning mechanism will be initiated.

Adjustment of the tension spring 28, since it stretches the hygrometer element, accomplishes fine calibration such that the precise proportionate relationship is achieved.

The mounting plate 22 is itself angularly movable and is so moved by a dial knob 32 which accordingly determines the effective temperature setting of the mechanism.

For rotatably supporting the mounting plate 22, the hub 20 thereof is telescopically received over a stationary post 33 which projects upwardly from the bottom of the base 16. For connecting the dial knob 32 to the mounting plate 22, a pinion 34 is provided. This pinion 34 is carried on one side of the dial knob 32 and cooperates with an arcuate rack 35 secured to the mounting plate 22. The dial knob 32 is mounted for angular adjustment upon a bracket 36 secured on the inside of one of the walls of the base 16.

The flange 37 of the dial knob 32 is accessible for manipulation through the cover 15. The dial may be marked, as at 38, to read "warmer," "comfort zone" and "cooler," which are actually effective temperature indications. The markings are also visible from the exterior of the cover 15. For these purposes, a T-shaped slot 39 is provided. An operative segment of the dial knob flange 38 projects through the vertical portion of the slot, and the horizontal portion of the slot 39 exposes the appropriate dial markings.

The base 16, hygrometer mounting plate 22, bimetal mounting sleeve 20 and the switch mounting sleeve 18 comprise four elements of a serially dependent mounting in which relative movement between any of the elements of the series correspondingly adjusts the relationship between the end elements of the series. It is the relationship of these end elements 16 and 18 which controls the air conditioning mechanism. Accordingly, adjustment between the first element 16 of this serially dependent mounting and the next element or mounting plate 22, as by the dial device, correspondingly affects the critical angular relationship of the end elements of the serially dependent mounting 16 and 18 without affecting the setting or adjustment of the remaining elements. Adjustment between the second mounting element 22 and the third mounting element 19, as by the hygrometer structure 21, similarly correspondingly affects the relative angular spacing between the end elements 16 and 18 of the serially dependent mounting. In a like manner, adjustment between the third element 19 of this serially dependent mounting and the last element 18, as by the bimetal 17, affects the relative angular position of the end elements 16 and 18.

In this organization, the bimetal 17 conveniently accomplishes two distinct functions. It not only serves as a means for supporting the end mounting element or sleeve 18 upon the next mounting element or sleeve 19, but it also serves as a means for positioning these elements with respect to each other.

Since the mercury switch 7 depends upon the force of gravity, it appears that an uncontrolled variable is introduced into this serial mounting, namely, the angular orientation of the base 16 relative to the horizontal. However, the base 16 is fixedly secured to a wall or other relatively immovable object. Accordingly, this variable is eliminated. Angular orientation of the base 16 could also be made non-critical by providing a contact on the base 16 cooperable with the contact carried at the end of the bimetal member 17. The mercury switch 7 is precisely the equivalent of such arrangement and it is more conveniently used, providing the base 16 is fixed. Thus, when the base is fixed, the angular orientation of the base and switch is the critical relationship.

In Fig. 4, there is illustrated the 66° effective temperature isotherm which is desirably maintained during winter months. It will be noted that although this isotherm also approximates a straight line, the equivalent linear relationship between relative humidity and dry bulb temperature is, in this instance, 10% relative humidity to every compensating degree change in dry bulb temperature. By relatively adjusting the hygrometer 21 and the bimetal 17 such that a 9% change in relative humidity is the equivalent of a compensating 1° change in dry bulb temperature, a thermostat structure responsive to effective temperature could be provided that is an effective compromise between cooling and heating functions. For heating purposes, of course a different controlling circuit would be necessary such that connection of the electrodes 8 and 9 results in interrupting operation of the heating system. Optionally, the control circuits permitting, the changeover may be accomplished by inserting the mercury switch 7 into the left-hand rather than the right-hand end of the mounting sleeve 18, as viewed in the drawings, such that upon a decrease in temperature, the electrodes are connected.

If a precise 8% to 1° ratio is desired for cooling and a precise 10% to 1° ratio is desired for heating, a simple device could be provided for shifting the angular orientation of the hygrometer 21 such that its effect upon the angular position of the arm 23 is modified appropriately. Furthermore, a simple linkage could be provided between the dial and an adjustable mounting for the hygrometer for maintaining appropriate relative effects of the hygrometer and the thermostat throughout a range of effective temperatures.

In Fig. 5, there is illustrated a potentiometer structure 40 for proportional control of a room conditioning system. The tap 41 is mounted on an arm 42 secured to the free end of the bimetal 17. The tap cooperates with a resistor 43 secured appropriately to the base 16. Control leads 44, 45 and 46 respectively connect to the ends of the resistor 43 and to the tap 41. The effective resistance between the leads controls the operation of the room conditioning system in a well-known manner.

In this form, the arm 42 or the tap 41 itself may be considered the end element of the serially dependent mounting.

The inventor claims:

1. In a control system: a thermostatic member having means movable in accordance with temperature for accomplishing a controlling function; a support for the thermostatic member; means mounting the support for movement in a path having a component corresponding to the direction of movement of the movable means; resilient means urging the support in one direction; a strand hygrometer urging the support in the opposite direction and maintained taut by said resilient means; and means for adjusting the strand tensioning force exerted by said resilient means.

2. In a control system: a base having a post; a plate rotatably mounted on the post; dial means for angularly adjusting the plate about the axis of the post; a coiled bimetal member having a fixed inner end carried by the plate for rotation about said axis, said bimetal member having a free end; a hygrometer carried by the plate having means movable to adjust the angular position of the fixed end about said axis; and a variable circuit element including a member carried by the free end of the bimetal member for varying the circuit element in accordance with the position of the bimetal member.

3. In a controller adapted to respond to the combination of dry bulb temperature and air humidity: means providing a fixed pivot; a support mounted for angular adjustment about said pivot; means forming a pair of spaced anchoring members mounted on the plate; a hair hygrometer having one end fixed to one anchoring member; a spring tensioning the hygrometer supported by the other anchoring member; an actuating arm connected between the hygrometer and the spring; a bimetal member supported at one of its ends for angular movement about said pivot; said arm in response to variations in the hygrometer serving to adjust the bimetal member about said axis; and means for performing a control function carried by the other end of the bimetal member.

4. In a controller adapted to respond to the combination of dry bulb temperature and air humidity: means providing a fixed pivot; a support mounted for angular adjustment about said pivot; means forming a pair of spaced anchoring members mounted on the plate; a hair hygrometer having one end fixed to one anchoring member; a spring tensioning the hygrometer supported by the other anchoring member; means for adjusting the tension of said spring; an actuating arm connected between the hygrometer and the spring; a bimetal member supported at one of its ends for angular movement about said pivot; said arm in response to variations in the hygrometer serving to adjust the bimetal member about said axis; and means for performing a control function carried by the other end of the bimetal member.

5. In a controller adapted to respond to the combination of dry bulb temperature and air humidity: means providing a fixed pivot; a support mounted for angular adjustment about said pivot; means forming a pair of spaced anchoring members mounted on the plate; a hair hygrometer having one end fixed to one anchoring member; a spring tensioning the hygrometer supported by the other anchoring member; an actuating arm connected between the hygrometer and the spring; a sleeve mounted for frictional adjustment about said pivot; said arm being joined to said sleeve; a bimetal member having an inner end joined to the sleeve; and a circuit controller carried by the free end of said bimetal member.

References Cited in the file of this patent
UNITED STATES PATENTS

| | | |
|---|---|---|
| 1,676,794 | Mailey | July 10, 1928 |
| 1,807,306 | Colman | May 26, 1931 |
| 1,881,950 | Rayfield | Oct. 11, 1932 |
| 2,059,846 | Bulger | Nov. 3, 1936 |
| 2,106,083 | Chappell et al. | Jan. 18, 1938 |
| 2,153,425 | Matthews et al. | Apr. 4, 1939 |
| 2,166,799 | Crago | July 18, 1939 |
| 2,191,630 | Shutts | Feb. 27, 1940 |
| 2,203,535 | Larson | June 4, 1940 |
| 2,220,061 | Brown | Nov. 5, 1940 |
| 2,255,639 | Annin | Sept. 9, 1941 |